UNITED STATES PATENT OFFICE.

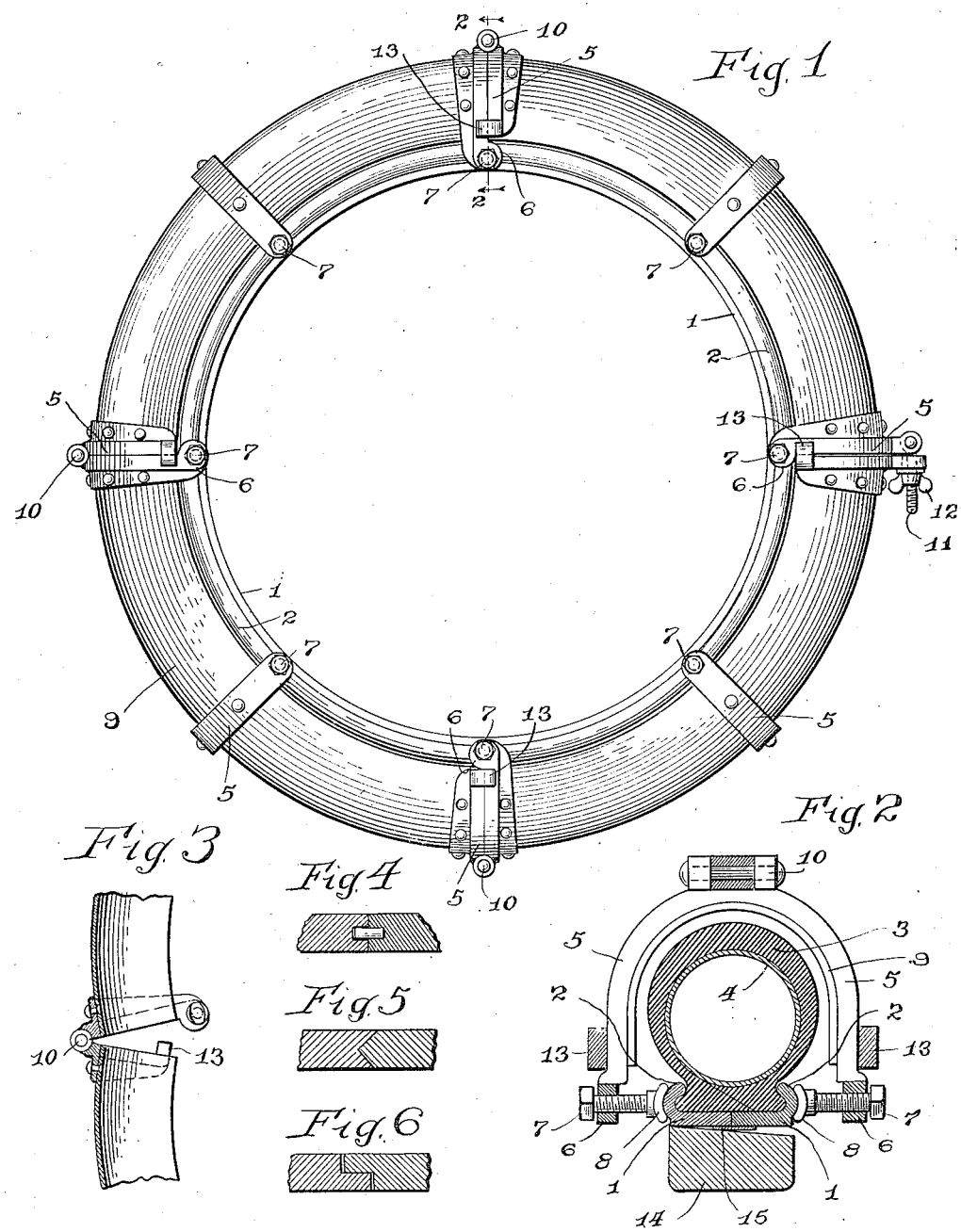

EDWARD A. BANSCHBACH, OF CHICAGO, ILLINOIS.

SPLIT-RIM AIR-RETAINER.

1,322,866.

Specification of Letters Patent. Patented Nov. 25, 1919.

Application filed June 27, 1917. Serial No. 177,190.

*To all whom it may concern:*

Be it known that I, EDWARD A. BANSCHBACH, a citizen of the United States, residing at Chicago, in the county of Cook and State of Illinois, have invented certain new and useful Improvements in Split-Rim Air-Retainers, of which the following is a specification.

This invention relates to a device for holding a split rim and a tire therefor in inflated condition so that the rim and tire can be carried and substituted for a demountable rim and tire of the same, or a different kind, as commonly used with automobiles.

The object of the invention is to make practical the use of a rim split longitudinally so that an inflatable tire may be used therewith, thereby preventing the difficulty now experienced in applying a tire to a rim and removing a tire from a rim, and in further overcoming the difficulty which occurs when a tire "freezes" to a rim.

The invention consists in the novel construction, combination and arrangement of the parts.

In the accompanying drawing—

Figure 1 is a side elevation of a rim and tire holder constructed in accordance with the principles of this invention.

Fig. 2 is a sectional view taken on line 2—2 of Fig. 1.

Fig. 3 is a longitudinal sectional view of one of the hinged joints; and

Figs. 4, 5 and 6 are modified constructions which may be used at the intersection of the rim parts.

It has been found that after an automobile rim and its tire have been in service for some time, the tire invariably sticks or "freezes" to the rim and it is very difficult to remove the tire for substituting a new one, or for having access to the inner tube to repair or replace it. Furthermore, it is desirable to carry extra tires and rims of the demountable type with the tires inflated so that a tire which has failed can be removed and a properly inflated one substituted. The inflation of a tire on a longitudinally split rim tends to force the rim sections apart even though the parts of the casing itself do adhere firmly to the rim parts and, therefore, some means must be provided for holding the rim and the tire in an inflated condition. The present invention complies with all of the above requirements and permits the application of such a rim and tire to the wheel of an automobile where the rim is first attached to the automobile wheel, and then the holder of the present invention is removed.

A tire-holding rim is formed with two sections 1, each of which has an upwardly extending tire-engaging flange 2 for engaging the correspondingly beaded edges of a casing 3 within which is an inflated tube 4. The casing is split longitudinally at or adjacent the center of the rim formed by the two rim sections 1 so that even if both of the rim sections adhere tightly to the corresponding parts of the casing, the rim sections can be separated when the rim and tire are removed from the wheel by prying the sections apart, or by forcing them apart due to the pressure of the tube 4, so that the tube 4 may be removed and a new tube inserted, when desired.

It is obvious that some means must be provided for holding the rim sections together when the tire is inflated and is not applied to the wheel of an automobile in order that the complete tire and rim may be ready for use and may be substituted for a punctured tire. A number of clamps 5 are therefore provided which are generally U-shaped in construction and are sufficiently large to pass loosely over the tire from the outside thereof. The ends of the clamps are formed with threaded extremities 6 through which bolts 7 are adjustable, each carrying a loose bearing member 8 which is pressed against the flange 2 of the rim section so that when the clamp is secured in place, the rim sections will be pressed firmly together, thereby holding the tire in its inflated condition.

Any suitable means may be used for spacing the clamps apart; a fabric cover, or a band of metal may be used, and the number of clamps for each rim is preferably the same as the number of clamps on the wheel of the automobile for clamping the demountable rim and tire in position. The spacing means shown in Fig. 1 comprises a plurality of sections 9 of thin metal, or the like, connected by hinges 10 near the outer periphery so that the sections may be swung outwardly to clear the tire in removing the holder therefrom, and an adjustable clamping device comprising a threaded member 11 and a winged nut 12 is provided for holding the hinged sections 9 together at the only point where they are not connected by a hinge. Each of the hinged parts carries a projection 13 which overlaps the adjacent hinged part when the hinged sections are closed, so that the tire holder will be strengthened and guided in place by the projections.

It will be seen that this rim and tire holder must not extend within the inner circumference of the rim sections 1 as it would then interfere with the application of the inflated tire and rim to the wheel of an automobile. In Fig. 2 the numeral 14 designates the rim or felly of an automobile wheel which has an inclined upper face in usual practice so that the rim parts 1 will slide thereon from the outer side of the wheel and may be held firmly in place on the rim by the clamping bolts, not shown, in connection therewith.

As shown in Fig. 2, one of the rim sections, or both of them if desired, is provided with a projection 15 which engages beneath the other rim part holding the two rim parts in alinement so that they may be pressed together more readily. Instead of the construction shown by Fig. 2, a pin and recess, connection as shown by Fig. 4, an angular edge construction as shown by Fig. 5, or a shouldered edge construction as shown by Fig. 6 may be employed. It is obvious that any of these forms will serve to guide and retain the rim parts in proper position with respect to each other.

In using this rim and tire holder the clamps are applied to an assembled tire and a split rim before the tire is inflated, and after the tire is inflated it may be carried as an extra tire and demountable rim of the well-known type. When it becomes necessary to substitute this for another demountable rim and tire, the whole structure is pressed over the felly of the wheel and the split rim is clamped in place from the sides, holding it rigidly in place on the wheel, the clamps are then loosened by unscrewing the bolts 7 and the holder as a whole is removed after unscrewing the attaching nut 12 so that the hinged sections 9 can be removed from the outside of the tire.

I claim:—

1. A device for holding a longitudinally split rim and an inflated tire in assembled relation to one another comprising a plurality of clamps, and a frame for holding said clamps in circular arrangement and in spaced relation relative to one another so that the parts of the longitudinally split rim may be held in assembled relation to one another by the inner portions of said clamps and so that the clamps extend outwardly from said rim and across the outer portion of the tire mounted on said rim.

2. A device for holding a longitudinally split rim and an inflated tire in assembled relation comprising a plurality of clamps each having spaced clamping jaws and a connecting yoke for supporting said jaws, and a frame for holding said clamps in spaced relation relative to one another and arranged in a circle to correspond to the contour of a rim and tire, said clamps being arranged on said frame so that the clamping jaws are positioned opposite the outer edges of the split rim engaged by said clamps and so that the connecting yokes extend outwardly from said clamping jaws and about the tire on said rim.

3. A device for holding the parts of a longitudinally split rim in assembled relation with one another against the pressure of an inflated tire mounted on said rim comprising a plurality of clamps circumferentially spaced about said rim to conform to the contour thereof, said clamps being arranged so that their inner portions engage opposite faces of said rim and so that they extend outwardly from said rim and about the outer periphery of the tire on said rim leaving the inner face of said rim clear of obstructions so that the rim may be positioned on a wheel while said clamps remain in place thereon and a movable frame connecting said clamps to hold them in assembled relation and to permit bodily movement of said rim onto and off of a wheel while said clamps are in place on said rim.

4. A device for holding the parts of a longitudinally split rim in assembled relation against the pressure of an inflated tire mounted thereon comprising a plurality of clamps for engaging said rim, and a frame for holding said clamps in circular arrangement to correspond to the contour of a rim held thereby, said frame being composed of separable sections to permit removal of said frame and clamps from a rim and tire held thereby.

5. A device for holding the parts of a longitudinally split rim in assembled relation against the pressure of an inflated tire mounted thereon comprising a plurality of clamps having oppositely disposed clamping jaws and a connecting yoke, and a frame for holding said clamps in circular arrangement to correspond to the contour of a rim and tire held thereby, said clamps being secured to said frame with their clamping jaws in position to engage opposite edges of said rim and with their connecting yokes extending outwardly from said clamping jaws to pass about a tire mounted on said rim leaving the space within said rim free so that said rim may be moved onto and off of a vehicle wheel with said clamps and frame in position thereon.

6. A device for holding the parts of a longitudinally split rim in assembled relation against the pressure of an inflated tire mounted thereon comprising a plurality of clamps having oppositely disposed clamping jaws and a connecting yoke, and a frame for holding said clamps in circular arrangement to correspond to the contour of a rim and tire held thereby, said clamps being secured to said frame with their clamping jaws in position to engage opposite edges of said rim and with their connecting yokes extending outwardly from said clamping jaws to pass about a tire mounted on said rim leaving the space within said rim free so that said rim may be moved onto and off of a vehicle wheel with said clamps and frame in position thereon, said frame being composed of circumferentially arranged sections to permit of the removal of said frame from a rim and tire.

7. A device for holding the parts of a longitudinally split rim in assembled relation against the pressure of an inflated tire mounted thereon comprising a plurality of clamps having oppositely disposed clamping jaws and a connecting yoke, and a frame for holding said clamps in circular arrangement to correspond to the contour of a rim and tire held thereby, said clamps being secured to said frame with their clamping jaws in position to engage opposite edges of said rim and with their connecting yokes extending outwardly from said clamping jaws to pass about a tire mounted on said rim leaving the space within said rim free so that said rim may be moved onto and off of a vehicle wheel with said clamps and frame in position thereon, said frame comprising a plurality of circumferentially arranged sections hinged to one another to swing outwardly away from said rim and tire to permit of the removal of said frame.

8. A device for holding the parts of a longitudinally split rim in assembled relation against the pressure of an inflated tire mounted thereon comprising a plurality of clamps having oppositely disposed clamping jaws and a connecting yoke, a frame for holding said clamps in circular arrangement to correspond to the contour of a rim and tire held thereby, said clamps being secured to said frame with their clamping jaws in position to engage opposite edges of said rim and with their connecting yokes extending outwardly from said clamping jaws to pass about a tire mounted on said rim leaving the space within said rim free so that said rim may be moved onto and off of a vehicle wheel with said clamps and frame in position thereon, said frame comprising a tire cover of rigid material made up of longitudinally arranged sections hinged together to swing outwardly from said rim and tire to permit the removal of said frame, and means for holding said sections in fixed position relative to one another when said frame is in position on said rim and tire.

In testimony whereof I have signed my name to this specification on this 23rd day of June, A. D. 1917.

EDWARD A. BANSCHBACH.